Aug. 31, 1948.  E. E. WALLACE  2,448,064
RETRACTABLE LANDING GEAR FOR AIRCRAFT
Filed April 14, 1943  8 Sheets-Sheet 1

INVENTOR.
Edward E. Wallace
BY Geo. A. Pitts
Attorney

Aug. 31, 1948.   E. E. WALLACE   2,448,064
RETRACTABLE LANDING GEAR FOR AIRCRAFT
Filed April 14, 1943   8 Sheets-Sheet 3

INVENTOR.
Edward E. Wallace
Geo. B. Pitts
BY   Attorney

Aug. 31, 1948.  E. E. WALLACE  2,448,064
RETRACTABLE LANDING GEAR FOR AIRCRAFT
Filed April 14, 1943  8 Sheets-Sheet 6

INVENTOR.
Edward E. Wallace
BY
Geo. B. Pitts
Attorney

Aug. 31, 1948.   E. E. WALLACE   2,448,064
RETRACTABLE LANDING GEAR FOR AIRCRAFT
Filed April 14, 1943   8 Sheets-Sheet 7

INVENTOR.
Edward E. Wallace
Geo. B Pitts
Attorney

Patented Aug. 31, 1948

2,448,064

UNITED STATES PATENT OFFICE 2,448,064

RETRACTABLE LANDING GEAR FOR AIRCRAFT

Edward E. Wallace, Cleveland Heights, Ohio; Daisy T. Wallace, administratrix of said Edward E. Wallace, deceased Application April 14, 1943, Serial No. 482,991

18 Claims. (Cl. 244—102)

This invention relates to an airplane, more particularly to mechanisms for facilitating landing of the airplane, resting and maneuvering thereof on land having surfaces that are flat and/or uneven, and take-offs therefrom.

One object of the invention is to provide an improved airplane having at one end thereof a mechanism supplemental to its landing gears arranged to co-operate therewith for facilitating operations of the airplane in making landings and/or take-offs, or maneuvering on land.

Another object of the invention is to provide an improved airplane having landing gears and pairs of auxiliary devices retractibly mounted in the body structure of the airplane forward and rearward of its landing gears and arranged to co-operate therewith under various operating conditions where land surfaces are flat or uneven.

Another object of the invention is to proivde an improved airplane having at one end thereof a retractible mechanism arranged to be operated into projected position, whereby the airplane may be shifted about its center of gravity or laterally to right or level it or position it for take-off dependent on the condition or unevenness of the terrain.

Another object of the invention is to provide an improved airplane having at the rear end thereof a retractible mechanism arranged to be operated into projected position for engagement with the surface to support the rear end of the airplane while at rest or preparatory for maneuvering or take-off thereof.

Another object of the invention is to provide an improved airplane having at one end thereof a pair of relatively movable devices each arranged to be projected varying distances to compensate for uneven surface conditions to support the airplane in stabilized position.

Another object of the invention is to provide an improved airplane having at one end thereof combined shock absorbing and leveling devices.

A further object of the invention is to provide an improved airplane having a landing gear and retractible mechanisms at its opposite ends arranged to be projected into engagement with the ground, whereby either end may be elevated and/or righted to move the plane into a stabilized position or position it for a take-off, dependent upon various conditions of the ground where a landing has taken place.

A further object of the invention is to provide an improved airplane having at one end thereof a retractible mechanism adapted to co-operate with the landing gear to facilitate landing on uneven surfaces and operable to elevate the plane after landing into stabilized position and/or to facilitate take-off.

A still further object of the invention is to provide an improved airplane having a landing gear and retractible shock absorbers adjacent one end of the fuselage arranged to co-operate with the landing gear in making landings.

A further object of the invention is to provide an improved tire for those parts of an airplane which are or may be used in making landings and take-offs or for maneuvering operations.

A further object of the invention is to provide an improved airplane having at one end a wheel mounted supporting member which may be rotated prior to or after making a landing to position the wheel for steering on different radii determined by the speed of the airplane.

A further object of the invention is to provide an improved airplane having at one end of its fuselage a steerable wheel and power means for steering the wheel, whereby the airplane may be steered independently of the speed thereof or speed of its propeller.

Other objects of the invention will be apparent to those skilled in the art to which my invention relates from the following description taken in connection with the accompanying drawings, wherein

Figs. 1b, 1c and 1d are diagrammatic views.

Fig. 2 is a front elevation of the airplane when at rest on the ground or landing surface; the front retractible mechanism being in normal position within the hull.

Fig. 3 is a view similar to Fig. 2, but showing the airplane in flight, its landing gears and retractible mechanisms being in retracted position.

Fig. 8 is a section on the line 8—8 of Fig. 4, looking towards the right.

Fig. 8a is a fragmentary plan view on the line 8a—8a of Fig. 8.

Fig. 8b is a section on the line 8b—8b of Fig. 8a.

Figs. 8c and 8d are fragmentary bottom plan views on the lines 8c—8c and 8d—8d, respectively, of Fig. 8, the cover in the former view being broken away.

Fig. 14 is a fragment section of parts shown in Figs. 13 and 14, enlarged.

In the drawings, 1 indicates as an entirety an airplane comprising a fuselage 2, wing structures 3 at opposite sides of the fuselage, ailerons 4, flaps 4', a rudder 6, elevators 7, landing gears 8 and propellers 9 driven by one or more suitable motors (not shown). In the illustrated type of airplane, each wing structure consists of a wing 3a and a sponson 3b, the latter being constructed to house the adjacent landing gear 8 (see Figs. 1, 3 and 4), whereby landings on and take-offs from water may take place. In the form of airplane disclosed, it is designed to have a gross weight of 400,000 pounds. The airfoil span is approximately 260 feet, the overall length approximately 185 feet and a height (when the landing gears are in operating position—see Figs. 2 and 5) approximately 45 feet; accordingly, this size of airplane makes it necessary to provide it with more than one engine, for which reason I have shown mounted on each airfoil 3a two propellers 9, which may be drivingly connected to one engine or each propeller driven by one or more engines; the engine or engines also being suitably mounted in the adjacent airfoil 3a or adjacent thereto.

It will be understood that the airplane may be of any desired size and that the number of engines required will depend upon the size of the plane and other factors.

The parts above referred to, may be of any desired shape and form of construction and the engines and propellers may be variously mounted, as they form no part of the present invention. As will be apparent, (a) the engines, (b) controls for and connections to the elevators 7, rudder 6, ailerons 4 and the engines, (c) flying instruments, such as gages and the like and (d) fuel and oil tanks for the engine, and electrical and other equipment, utilized for propelling the airplane are not shown as these parts, accessories and equipment may be of any well known construction and form no part of the present invention.

The herein disclosed construction of the landing gears, their operating mechanisms and housing thereof form the subject-matter of my co-pending application Serial No. 431,102, filed February 16, 1942 now U. S. Patent 2,415,615 of February 11, 1947.

Figures 1, 1A, 9A:
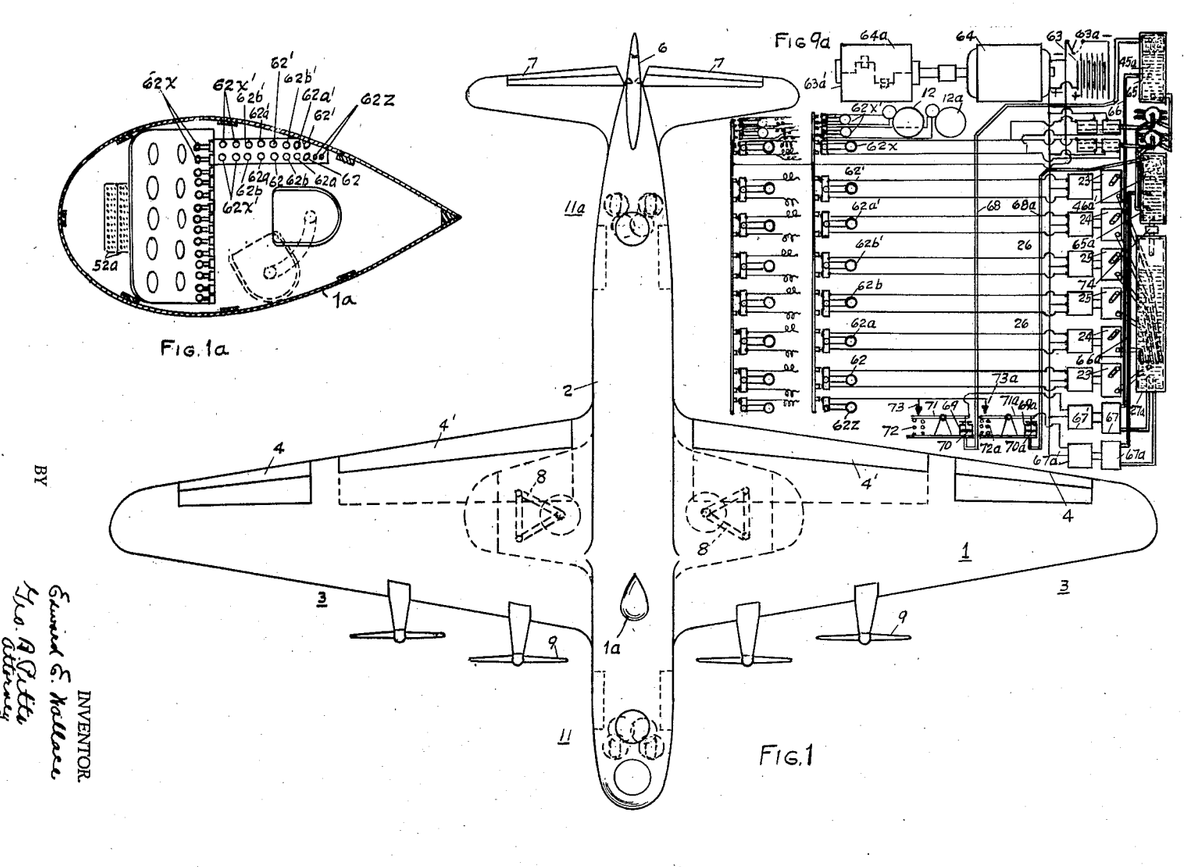
Fig. 1 is a plan view of an airplane embodying my invention.
Fig. 1a is a fragmentary section on the line 1a—1a of Fig. 2, enlarged.
Fig. 9a is a diagrammatic view of the pumps and motors therefor for one of the retractible mechanisms, generator and storage batteries for supplying current to the motors, engine for driving the generator and the sets of switches for the circuits for the motors for both mechanisms.
Figures 1C, 1D, 2, 3:
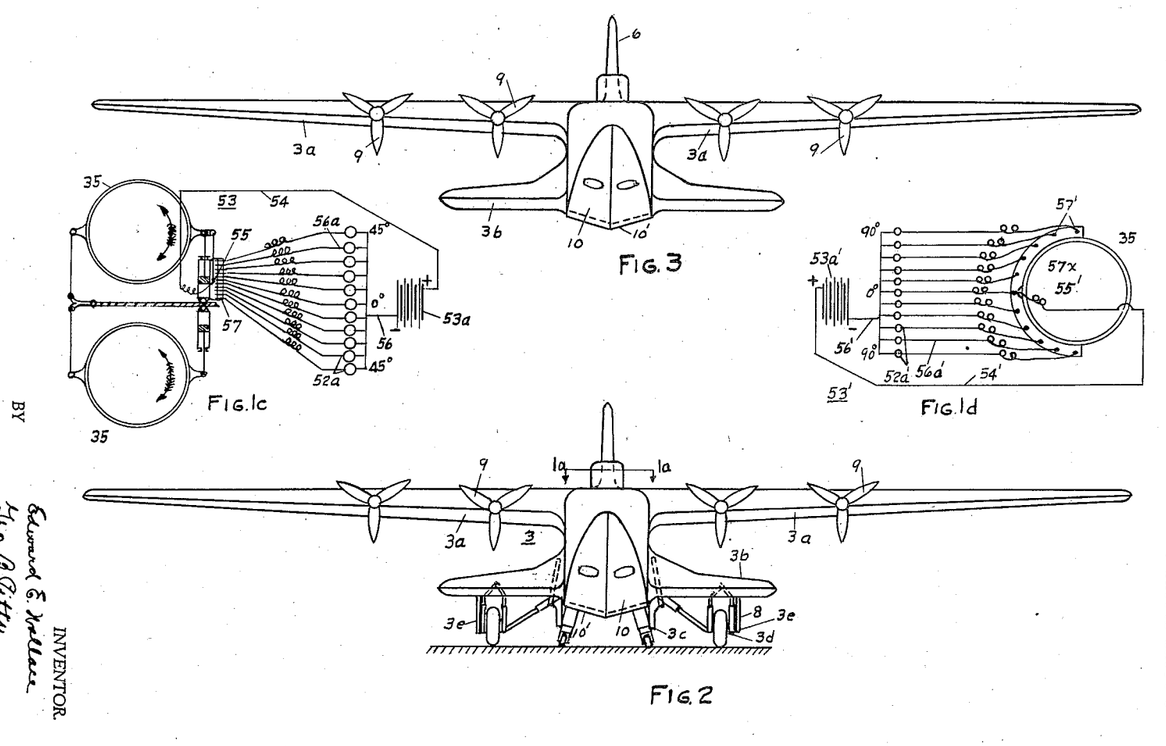

As shown in Figs. 2 and 3, the lower portion of the fuselage is constructed to provide a hull 10 the bottom wall of which preferably consists of inclined portions 10' extending from the lateral sides or chines of the hull 10 downwardly and inwardly to the keel forming a V-shaped bottom.

However, in showing herein a sesque amphibian type of plane, it is to be understood that the invention may be applied to and incorporated in other types of airplane, whether the landing gears are fixedly related to the fuselage thereof or retractible into an inoperative position. Accordingly, the use of the term "hull" is merely for descriptive purposes and not intended to be limiting.

Each sponson 3b is fixedly related to the hull 10 and is (a) provided interiorly with a compartment or chamber opening downwardly, but closed by doors 3c, 3d, 3e, to house the adjacent landing gear 8 (see dotted lines in Fig. 1), when landing on and taking off from water and when the plane is in flight as set forth in my aforesaid application and (b) suitably reinforced and braced interiorly in any desired manner. The reinforcing and bracing structure for each sponson forms no part of the present invention.

11 indicates as an entirety a retractile mechanism mounted in the hull forward of the landing gears 8, preferably adjacent the front end of the hull and 11a indicates as an entirety a retractile mechanism mounted in the hull rearward of the landing gears 8, preferably adjacent the rear or tail end of the hull. Each mechanism 11, 11a, may consist of a single retractile member operated in the manner later set forth, the member for one mechanism being mounted forward of the landing gears and the member for the other mechanism being mounted rearward thereof. When each mechanism is of this form of construction, the member is mounted in line with the longitudinal axis of the hull. By preference each mechanism 11, 11a, consists of two members indicated as an entirety at 12, 12a, respectively, operable together or separately by fluid supplied under pressure, from a position within the hull 10 outwardly to predetermined positions, whereby either or both mechanisms or one or more members thereof may cooperate with the landing gears under different conditions.

Each of the members 12, 12a, is provided with shock-absorbing means, indicated as an entirety at 13 and is provided at its outer or ground engaging end with a wheel 14, comprising a hub or rim and a tire, which may be of any desired form of construction, but for purposes of illustration the wheel 14 (more particularly the tire thereof) embodies certain improvements, set forth in my co-pending application filed May 7, 1943, Ser. No. 485,979, for which reason no claim thereto is made herein. This application has now matured into U. S. Patent 2,365,940 of August 29, 1944.

Also, as later set forth, each member 12, 12a, is rotatable to position the axis of the wheel 14 at varying angular relations to the longitudinal axis of the hull 10, whereby the wheel may be positioned to permit steering or maneuvering of the airplane on the land or other surface. As will be later set forth, elements of each member 12, 12a, are movable outwardly relative to the hull 10, toward the ground and upon engagement therewith, if the application of the power means is continued, the relative movement will, in a paradoxical sense, be reversed, that is, that element which engages the ground will be arrested with respect thereto and the hull 10 will move upwardly relative to the ground, thereby moving the adjacent end of the hull 10 upwardly to the desired position. On the other hand, reverse movement of these elements will permit the hull 10 to gravitate downwardly, unless such movement is prevented by the landing gears and/or other of the retractible members.

It will also be noted that the members 12, 12a, of each mechanism 11, 11a, are arranged side-by-side and preferably so mounted that the movable elements of the members move on axes which converge upwardly and intersect the central longitudinal axis of the airplane (preferably that axis which cuts the center of gravity of the airplane) for obvious reasons in making a landing or leveling the airplane at any time to prevent lateral thrusts or tipping movement thereof when these members engage the land or other surface.

Figures 4, 5:
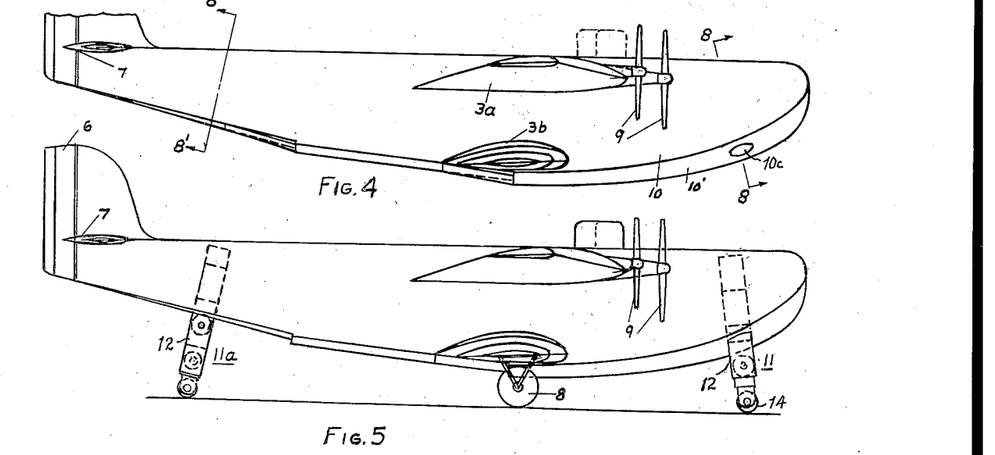
Fig. 4 is a side elevation of the airplane in flight.
Fig. 5 is a side elevation, showing the airplane at rest with the front and rear retractible mechanisms projected into engagement with the ground and supporting the airplane in leveled position and against movement due to external forces.

In the arrangement herein disclosed, the ground engaging element of each member 12, 12a, is movable outwardly a total distance of approximately 25 feet, but each member is so constructed that by control of the power means therefor the ground engaging element may be moved outwardly (a) approximately 5 feet to one predetermined position (which position may be termed its landing position) or a lesser distance, (b) approximately 12 feet farther to a second predetermined position (which position may be termed its first leveling position) or a lesser distance and (c) approximately 8 feet farther to a third predetermined position (which may be termed its second leveling, tilting or extreme outermost position) or a lesser distance. Accordingly, when a landing is to be made the members 12, 12a, are projected to the first predetermined position (Fig. 7), whereby they may act as shock absorbers. After the landing is made, one or more members may be operated to move the hull 10 into another position. For example (a) if the airplane in landing has come to rest in the position shown in Fig. 7, the members 12, 12a, of the mechanism 11 may be projected a greater distance outwardly, as shown in dotted lines in Figs. 5 and 6, the effect of which is to rock the hull—shift its center of gravity—to the position shown in Fig. 6; (b) if the airplane is to be leveled, both members of both mechanisms 11, 11a, may be operated to the positions shown in Fig. 5; (c) if the airplane is at rest in the position shown in Fig. 6 and a strong wind is blowing from the right, as viewed in Fig. 6, the members of the rear mechanism may be projected outwardly a greater distance, as shown in dotted lines in Fig. 7, the effect of which is to rock the hull to the position shown in full lines in Fig. 7 so that the wind in acting on the wings will create a down-force on the airplane, and (d) where the terrain below the hull 10 is uneven, the members 12, 12a, of one or both mechanisms may be projected different distances (see (Fig. 11), to level the airplane as shown in Fig. 5.

Figures 6, 7:
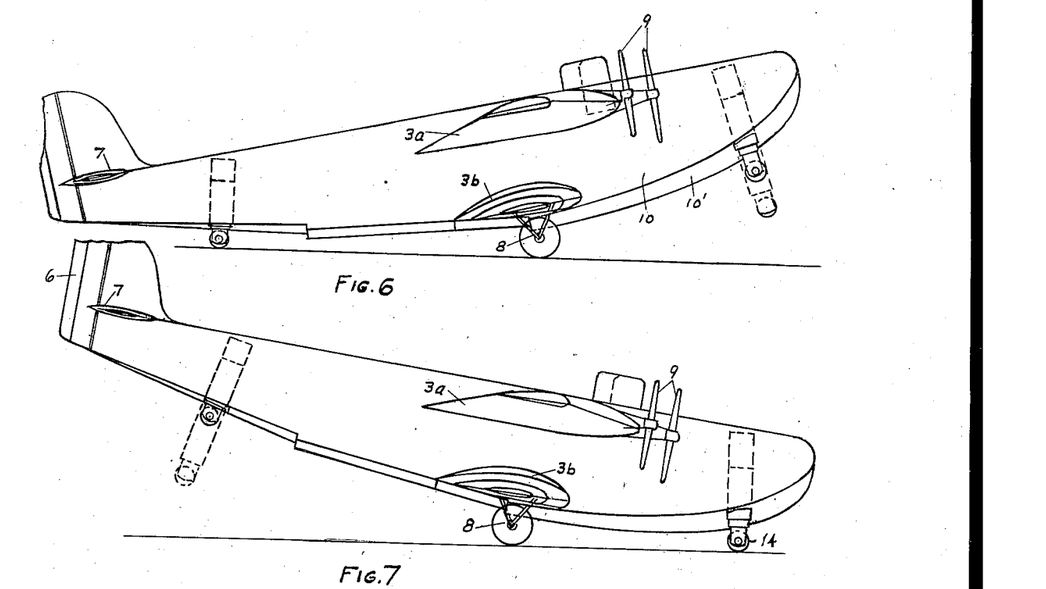
Fig. 6 is a side elevation showing the airplane in landing position or in position for maneuvering on the ground or for taking off.
Fig. 7 is a side elevation showing the position of the forward retractible mechanism when making a landing under certain abnormal conditions.

As will be observed in Fig. 6, the members of the rear mechanism 11a when moved or projected to their first predetermined position serve as skids in making a take-off or in maneuvering the airplane into loading, unloading and take-off positions. By projecting all of the members into engagement with the ground (see Fig. 5), the airplane may be supported in any desired position, that is, horizontally or otherwise. When the airplane is in flight, the members of both mechanisms may be retracted within the hull 10 to eliminate drag. By control of the power means for each member, the ground engaging element thereof may be moved inwardly toward its retracted position or to any desired projected position.

As each member 12, 12a, is similar in construction, only one is referred to, but the same reference characters are used to identify like parts in all views and in describing one member reference is made to other members for a complete understanding of the construction.

Each member 12, 12a, consists of a plurality of hollow, concentrically related, elements, relatively movable endwise and suitably keyed together (as later set forth) for rotative movement as a unit, to change the position of the wheel 14 as already set forth. As later set forth, the elements are constructed so that one element serves as a piston and the adjacent element serves as a cylinder, whereby by means of a fluid supplied under pressure and/or a fluid under static or negative pressure, due to the control of the power means, which comprise suitable pumps (later referred to), relative endwise movement of the elements may be effected to move one or more of the elements outwardly predetermined distances (Figs. 9, 11 and 11a) as already set forth and move all of the movable elements inwardly to any desired position or into their retracted or normal position (see Fig. 8).

Figures 8, 8A, 8B, 8C, 8D, 11B:
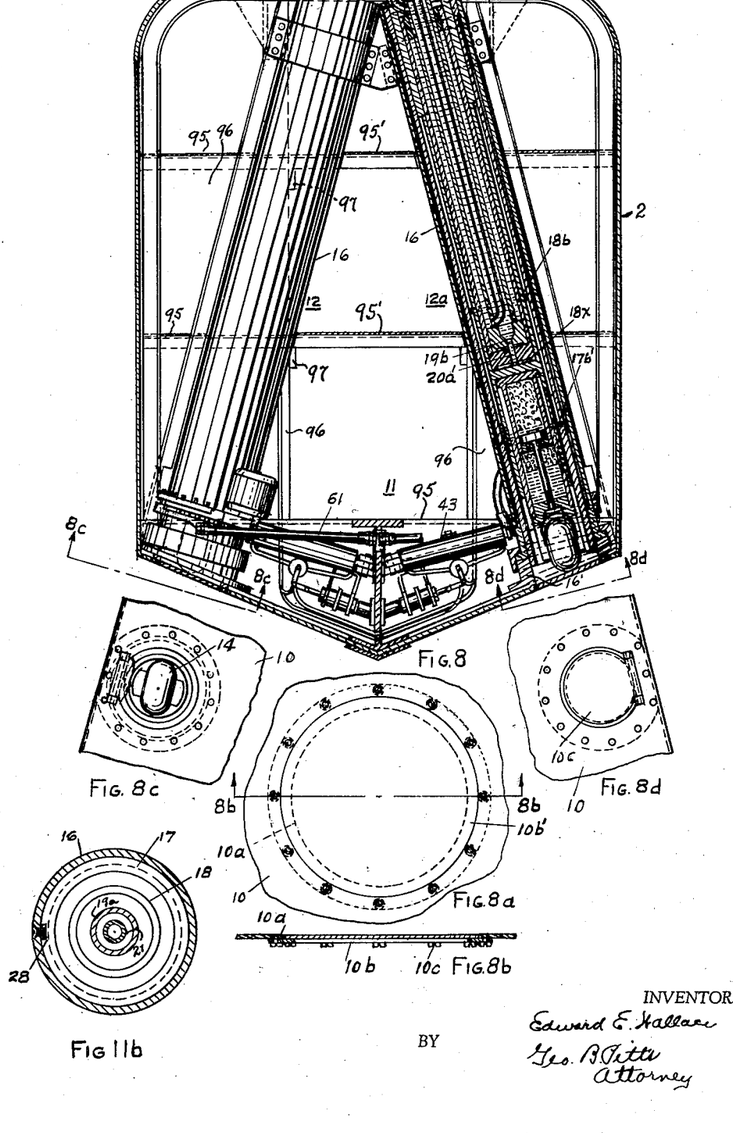

16 indicates the outer element rotatably mounted in the hull 10, its upper end being provided with an annular end wall 16a to form a stop for the adjacent intermediate element 17, which is provided at its upper end with an external annular shoulder 17a slidably fitting the inner wall of the element 16. At its lower end, the element 16 is provided with an internal annular shoulder 16b slidably fitting the outer wall of the element 17 and forming a stop for the shoulder 17a to limit the outward movement of the element 17. The shoulder 17a serves as a piston when fluid under pressure is supplied to the space between the elements 16, 17, whereby the latter element is moved inwardly into engagement with the wall 16a. The element 16 is formed with an opening 16c adjacent to the stop 16b. The opening 16c is connected to a supply and discharge pipe 16x which is connected to a suitable pump 23 (later referred to); that portion of the pipe 16x connected to the opening 16c is flexible to compensate for the rotative movement of the element 16. The space between the elements 16 and 17 is maintained filled with fluid, under static pressure, as shown at a, to lock the element 17 against movement, until the pump connected to the pipe 16x is set in operation to relieve or set up a negative pressure by withdrawing the fluid from this space. As shown, the upper end portion of the outer element 16 rotatably fits a split bearing 16c', the inner member of which is supported by a gusset 16c''. The lower end of the element 16 is provided with an external flange 16d which rotatably engages a bushing 16' suitably fixed to the adjacent chine 10' and surrounding an opening 10b through which the movable elements project. A cap 16'', which is provided internally with screw threads and threaded on the bushing 16', engages the flange 16d of the element 16 to hold it in engagement with the bushing 16'. The opening 10b is provided with a hinged closure 10c, its hinge devices being acted upon by a suitable spring (not shown) which normally tends to swing the closure into closed position (Fig. 8). By removing the cap 16'' and outer member of the split bearing 16c', the member 12 may be bodily removed from the hull 10. To permit of the removal of either or both members 12, 12a, the adjacent top wall of the hull 10 is formed with an opening 10a which is closed and suitably sealed by a cover 10b' by means of screws 10c.

Figures 9, 9B:
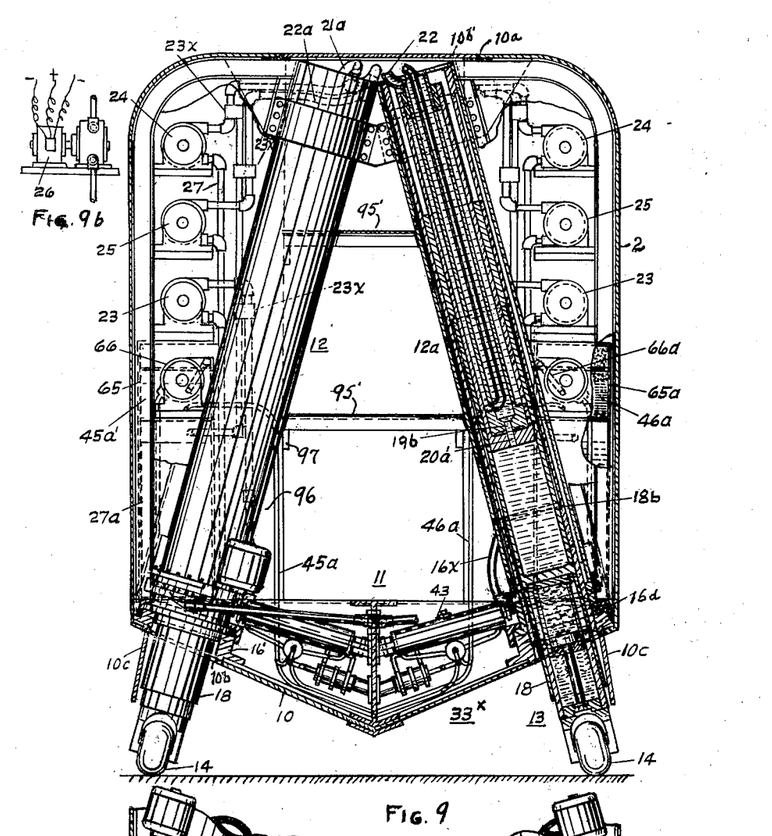
Fig. 9 is a section on the line 8—8 of Fig. 4, looking toward the left, parts being in sections; the retractible devices being in one projected position.
Fig. 9b is a fragmentary elevation showing one of the fluid pumps and the motor for driving it.

The means for rotating the element 16 and through it the other elements of the member 12, are referred to later. The element 17 is provided with a stepped portion 17b at its lower end to form a shoulder 17b' remote therefrom. 18 indicates that element which in effect constitutes the ground engaging device of the retractible member. The element 18 slidably fits the inner wall of the stepped portion 17b of the element 17 and is provided at its upper end with a collar 18a (preferably formed integrally with the walls of the element) which slidably fits the inner wall of the element 17. Remote from its outer end, the element 18 is provided with an annular rib 18b (preferably formed integrally therewith) arranged to engage the shoulder 17b', so that when the element 18 is moved to the first and second leveling positions, the element 17 will be moved like distances to form a support for the element 18 between it and the element 16. The rib 18b is preferably positioned on the element 18 so that when the elements are in normal position, it is spaced approximately five feet from the shoulder 17b'. In this arrangement, when the element 18 is moved to its landing position, as shown at the left side of Fig. 11, the rib 18b will be in position to engage the shoulder 17b' and move the element 17 outwardly therewith. 18x indicates a transverse wall within the element 18 remote from its outer end to form a chamber 18x' within which the shock absorbing means 13 are mounted and to provide a piston against which the fluid under pressure is applied to move the element 18 outwardly, as later set forth. 19 indicates a head fixed to or formed integrally with the lower end of a tubular element 19a, the upper end of which is soldered or welded to the inner wall of the stop 16a. 20 indicates an element slidably fitting the inner wall of the element 18. At its lower or inner end the element 20 is provided with an end wall 20a which forms a head for the piston 18x of the element 18 and a piston for the element 20 when the fluid under pressure is supplied to move the element 20 outwardly. The inner wall of the element 20 slidably fits the head 19. The upper end of the element 20 is provided on its inner wall with a collar 20b which slidably fits the outer wall of the tubular member 19a. As shown, the diameter of the tubular member 19a is smaller than that of the element 20 to form between the head 19 and the collar 20b an annular chamber 20c which is filled with fluid under static pressure as shown at b, to lock the element 20 against movement when fluid pressure is applied to the piston 18x to move the the element 18 to its landing position. The lower end of the chamber 20c is suitably connected to the inner end of a supply and discharge pipe 21 for the fluid, which pipe extends through the tubular member 19a, being connected at its outer end to a flexible pipe 21a, which in turn is connected to a suitable pump, as later set forth. The pipe 21 is smaller in diameter than the tubular member 19a, so that the latter may serve as a conduit for fluid under pressure for the pistons 18x and 20a. As shown, the head 19 is formed with a through opening 19b and the piston 20a is formed with a through opening 20a' in registry therewith, to permit the application of fluid pressure against the piston 18x to move the element 18 to its landing position (Figs. 9 and 10). The upper end of the tubular member 19a is connected to a nipple 22 which in turn is connected to a pipe 22a leading to a suitable pump (later referred to), that portion of the pipe 22a connected to the nipple 22 being flexible to compensate for the rotative movement of the tubular member 19a with the elements 16, 17 and 18. As the tubular member is connected through the nipple 22 and pipe 22a with a pump, it is at all times maintained filled with the fluid. As shown in Figs. 8, 9, and 11, the outer face of the wall 20a is relieved to form a space for the fluid, whereby initial pressure may be applied to the wall 18x and the outer face of the head 19 is relieved to form a space for the fluid, whereby initial pressure may be applied to the wall 20a.

The power means for each member 12, 12a, consists of three pumps 23, 24, 25 (see Fig. 9), each driven by a motor 26 (see Fig. 9b). The pumps are preferably of the rotary type and of any standard or preferred construction. One side of each pump is connected by a pipe or conduit 27 to a sump or reservoir 27a for the fluid, such as oil. The opposite side of pump 23 is connected to the pipe 16x for the adjacent retractible member; the opposite side of pump 24 is connected to the pipe 22a for the adjacent nipple 22; and the opposite side of pump 25 is connected to the pipe 21a for the adjacent discharge pipe 21. The pumps are operable in opposite directions and separately controlled to effect relative movements of the elements forming the adjacent retractible member in the manner later set forth. Accordingly, each pipe connected to each pump forms both a liquid supply and discharge dependent upon the direction of rotation of the pump.

Operation: assuming that the elements of the member 12a of the mechanism are in normal position (Fig. 8) and it is desired to move them to the landing position (Fig. 9), the pump 24 is operated to draw fluid from the sump 27a to effect flow therefrom to and through pipe 22 to the tubular member 19a and openings 19b, 20a', the effect of which is to apply the pressure to the piston 18x and move the element 18 outwardly to the landing position. In carrying out this operation, the pumps 23 and 25 remain stationary so that the fluid in the space between the elements 16 and 17 and the space between the element 20 and the tubular member 19a is under static pressure, whereby the elements 17 and 20 are locked against movement. By reversing the pump 24, a negative pressure will be set up in the tubular member 19a, the effect of which will be to draw the fluid from the element 18 through the openings 20a', 19b, and discharge the fluid into the sump 27a.

This negative pressure will be effective to draw the piston 18x inwardly and thereby retract the wheel 14 into normal position (Fig. 8).

If it is desired to project the element 18 from the landing position (Fig. 9) to the first leveling position (as shown at the right side of Fig. 11), (a) pump 24 is operated to effect flow of the fluid under positive pressure through the tubular member 19a and openings 19b, 20a', into the element 18, the effect of which is to apply pressure to the piston 18x; and (b) pumps 23 and 24 are operated simultaneously to set up a negative pressure in the pipes 16x and 22 to withdraw the fluid from the spaces between the elements 16 and 17 and between the tubular member 19a and element 20, such withdrawal of the fluid serving to permit the elements 17 and 20 to move outwardly with the element 18. In carrying out this operation, it will be observed that through the engagement of the rib 18b with the shoulder 17b', the element 17 will be moved outwardly with the element 18, and the pressure of the fluid supplied by the pump 24 will move the element 20 outwardly with the element 18. By reversing the pumps 23, 24 and 25, the elements 17, 20 and 18 will be moved inwardly to any desired position.

If it is desired to project the element 18 from its first leveling position (right side of Fig. 11) to its second leveling, tilting or outermost position (Fig. 11a), (a) pump 24 is operated to effect flow of the fluid under positive pressure through the tubular member 19a and openings 19b, 20a', to apply pressure to the piston 18x to move the element 18 outwardly, (b) pump 23 is operated to withdraw fluid from the space between the elements 16 and 17 and (c) pump 25 remains stationary.

In carrying out this leveling or tilting operation, it will be observed that through the engagement of the rib 18b with the shoulder 17b', the element 17 will move outwardly with the element 18 to form a support for the latter element between it and the element 16. If the pumps 23 and 24 are reversed, the fluid under positive pressure will be supplied through the pipe 16x to the space between the elements 16 and 17 and applied to the collar 17a to return element 17 to the leveling position as shown in Fig. 11 and the element 17 in turn, due to the engagement of shoulder 17b' with the rib 18b, will move the element 18 to its first leveling position due to the withdrawal of the fluid therefrom. Of the reverse operation of the pumps 23 and 24 is continued and pump 25 is operated to supply fluid through the pipe 21 to the space between the member 19a and element 20, the element 18 will be returned to its landing position, as shown in Fig. 9 and if such reversed operation of pump 24 is further continued and operation of pumps 23 and 25 is stopped the element 18 will be returned to its normal position.

Figure 10:
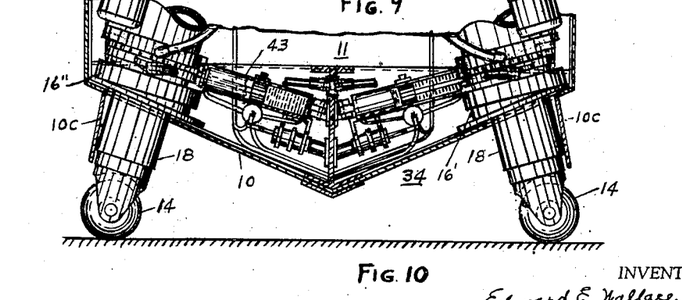
Fig. 10 is a fragmentary elevation of parts shown in Fig. 9, the wheel carrying members being shown in position to permit steering of the airplane in maneuvering on the ground.
Figures 10A, 11, 11A, 11C, 11D:
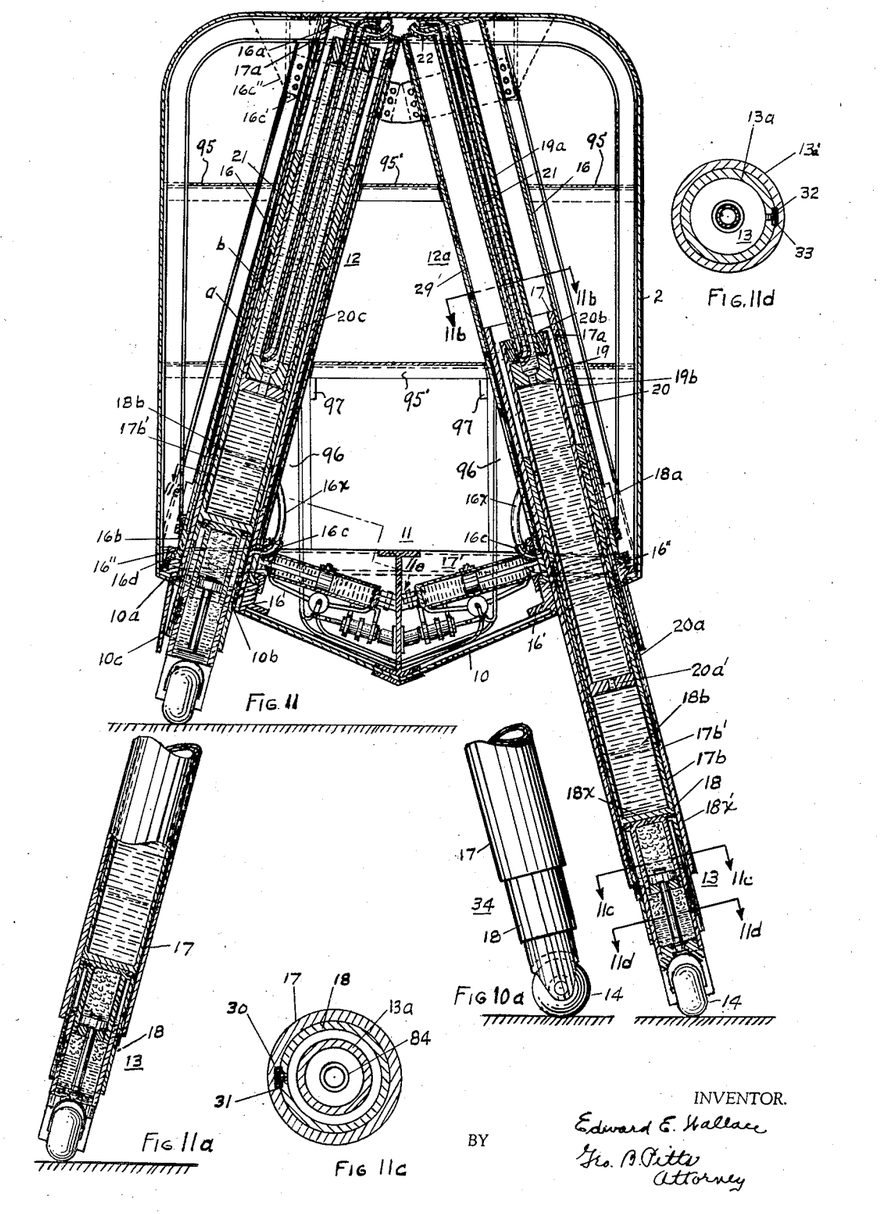
Fig. 10a is a fragmentary elevation showing one of the wheel carrying members extended and rotated for steering or maneuvering operations.
Fig. 11 is a view substantially similar to Fig. 9, but showing the retractible devices in different projected positions.
Fig. 11a is a fragmentary view, partly in section, related to Fig. 11 to show the outermost position of one of the retractible devices.
Figs. 11b, 11c, 11d are sections on the lines 11b—11b, 11c—11c, and 11d—11d, respectively, of Fig. 11.

It will be observed that prior to the operation of moving either or both members 12, 12a, from the landing position to their leveling or tilting position, due to the diverging relation thereof, the element 16 and parts connected thereto must be rotated 90°, so that one or both wheels 14 are disposed at right angles to the fuselage (see Figs. 10 and 10a). When the elements are returned to the landing position, the members may be rotated to return the wheels 14 to normal position.

Suitable relief valves 23x are provided in the connections between the pumps and the sump so that in the event the pumps continue running, danger of stalling the motors which drive the pumps, is avoided.

It will be observed that the fluid systems above described are of the closed type, so that operation of each pump in either direction effects outward flow of the fluid through one pipe connected to the pump and inward flow thereto from the other pipe connected to the pump; also, during operation of the elements, stoppage of the pumps then in operation will effect stoppage of the elements. Accordingly, the element 18 may be moved outwardly and inwardly varying distances.

Certain of the elements of each retractile member 12, 12a, are keyed together so that when the rotating means 17' (which are connected to the element 16) are operated in either direction the element 18, which through the shock absorbing means 13 supports the wheel 14, may position the latter in position for forward travel of the airplane or at an angle to facilitate steering or maneuvering thereof. As shown in Figs. 8, 9, 11 and 11b, the outer wall of the element 17 is formed with a longitudinally extending insert which is formed with a keyway 28 and the inner wall of the element 16 is provided with a spline 29 secured in position by countersunk screws (see Figs. 11 and 11b) and slidably fitting said keyway. As shown in Fig. 11c, the inner wall of the element 17 is provided with a longitudinally extending insert which is formed with a keyway 30 and the outer wall of the element 18 is provided with a key 31 secured in position by countersunk screws, and slidably fitting said keyway. As shown in Figure 11d, the inner wall of the element 18 is formed with a longitudinally extending insert which is formed with a keyway 32 and the outer wall of a member 13a, which forms part of the shock absorbing means 13 and carries the wheel 14, is provided with a key 33 secured in position by countersunk screws.

33x indicates as an entirety mechanism for simultaneously rotating the members 12, 12a, of each retractile mechanism 11, 11a, whereby the adjacent wheels 14 may be moved to various angular positions (preferably through an arc of 45 degrees) for steering the airplane when completing a landing or in moving the plane from time to time. These mechanisms are similar in construction so that only one is illustrated and needs to be described. 34 indicates as an entirety means for rotating each member 12, 12a, of each mechanism 11, 11a, whereby (a) each member may be rotated approximately 90 degrees (see Fig. 10a) when it and/or the member adjacent thereto or both of said members are to be adjusted outwardly or inwardly, so that one wheel 14 may have rolling contact with the ground or (b) both wheels 14 may be set in various angular positions (for example, at right angles to the longitudinal axis of the plane—see Fig. 10) for maneuvering the plane on the ground from time to time. The mechanisms 34 for operating the members 12, 12a, are similar in construction, so that only one thereof will be hereinafter described. The mechanisms 33x and 34 operate independently of each other and also independently of the hydraulic means for moving the elements of each member 12, 12a, outwardly or inwardly, so that the rotation of the members may be effected when in their retracted position or in any projected position thereof. Each mechanism 33x is arranged to simultaneously rotate the adjacent members 12, 12a, from neutral position through an arc of 45 degrees in either direction, the wheels 14 being in neutral position when their axes are at right angles to the longitudinal axis of the airplane, whereas each mechanism 34 is arranged to rotate the adjacent member from neutral position through an arc of 90 degrees in either direction. Of the rotatable means 33x, 35 indicates a collar rotatably fitting the wall of the element 16, a portion of the outer wall of the collar 35 being provided with gear teeth 36, in mesh with a gear 37 fixed to a shaft which is provided with a second gear 38. The gear 38 is in mesh with a pinion 39 fixed to the shaft of a motor 40, which is suitably supported on the side wall of the element 16, this gearing forming a lock between the collar 35 and the element 16, so that when the power is applied to the collar 35, the element 16 and parts connected thereto will be rotated, but by holding the collar stationary and operating the motor 40, the element 16 and parts connected thereto will be rotated relative to the collar. At one side, the collar 35 is provided with an arm 41 (see Fig. 11e) to which the outer end of a piston rod 42 is pivotally connected, the inner end of the piston rod 42 being provided with a piston 42a, which is reciprocatably mounted in a cylinder 43, so that by application of pressure to either side of the piston, the latter is operated to rotate the element 16. It will be noted that parts similar to those just described are provided for rotating the other element 16 of the adjacent retractible mechanism, so that both may be operated simultaneously, but by preference I provide operating connections, indicated as an entirety at 44 (later referred to), between the collars for the elements 16 of the adjacent mechanisms to insure that these elements will be moved equal distances. The inner end wall of cylinder 43 is pivotally mounted on the keel of the hull 10 to permit it to bodily swing during rotative movement of the collar 35. When the element 16 is in normal position the piston 42a is disposed midway the opposite ends of the cylinder 43, so that pressure applied to either side of the piston will move it toward the remote end of the cylinder.

In the preferred form of construction I provide (a) fluid connections 45, 45', to the opposite ends of the cylinder 43 for fluid under high pressure (approximately 100 pounds) supplied by a pipe 45a leading from a source of supply 45a', (b) fluid connections 46, 46', to the opposite ends of the cylinder 43 for fluid under low pressure (approximately 10 pounds) supplied by a pipe 46a leading from a source of supply 46a' and (c) a valve 47, which is normally closed (see Figure 12), for controlling the fluid supply to and discharge from the cylinder. The fluid employed consists of oil the quality of which depends upon climatic conditions under which the airplane is used. The valve element of valve 47 is provided with ducts 47a, 47b and 47b', so that in one position (Figure 12a) fluid under high pressure from the pipe 45a is supplied through the duct 47a to the connection 45 and cut off through the connection 45' and fluid under low pressure is cut off through the connection 46 and completed through the connection 46' and duct 47b' to the pipes 46a, whereas in the other position of the valve (Figure 12b) fluid under high pressure from the pipe 45a is supplied through the duct 47a to the connection 45' and cut off through the connection 45 and fluid under low pressure is cut off through the connection 46' and completed through the connection 46 and duct 47b to the pipe 46a, so that the piston 42a may be moved in either direction from neutral or any previously operative position.

Figures 11B, 11E, 11F, 11G, 11H, 12, 12A, 12B:
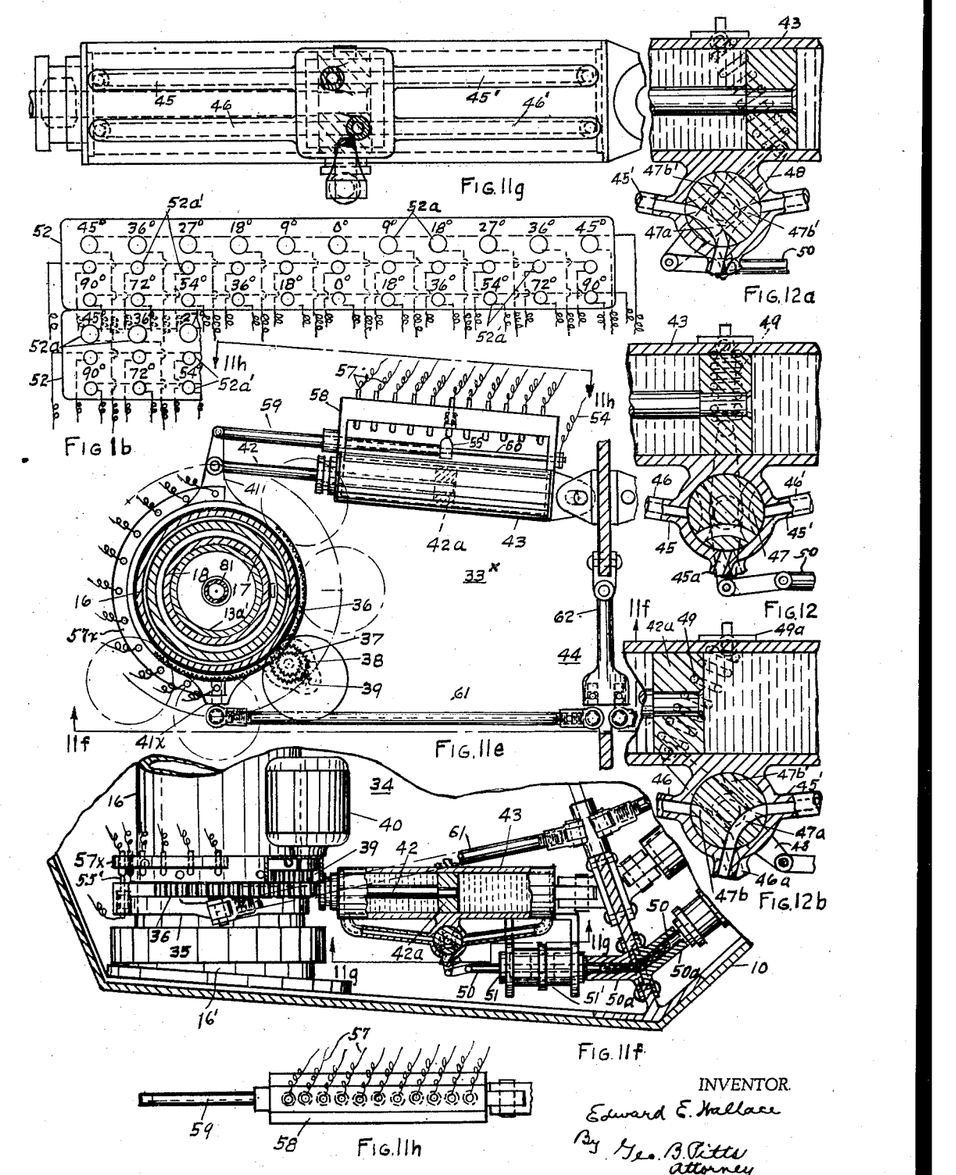
Fig. 11e is a section on the line 11e—11e of Fig. 11, the parts being enlarged.
Fig. 11f is a fragmentary side view of parts shown in Fig. 11e, partly in section.
Fig. 11g is a section on the line 11g—11g of Fig. 11f.
Fig. 11h is a view on the line 11h—11h of Fig. 11e.
Fig. 12 is a fragmentary view showing the valve in normal or closed position.
Fig. 12a and Fig. 12b are views similar to Fig. 12, but showing the valve in its operated positions, respectively.

As shown in Figure 11f, the cylinder 43 at opposite sides of the piston 42a is always filled with fluid, so that when the valve 47 is closed, the piston (and all parts connected thereto) is locked against movement, but as set forth above where the valve connects the high pressure fluid supply to one end of the cylinder it connects the low pressure supply with the opposite end thereof. Accordingly, upon supply of the fluid under high pressure to one end of the cylinder the piston is moved toward the opposite end thereof, the fluid in the cylinder on the remote side of the piston being forced through the low fluid pressure connections to the pipe 46a and through the latter to the low pressure supply 46a'.

The shank of the valve element is provided with an arm 48 to which one end of a spring 49 is connected, its opposite end being suitably anchored to a bracket 49a which may be supported on the wall of the cylinder 43. The spring 49 is put under tension when the valve element is operated from neutral position in either direction, so that when the valve element is released, the spring 49 serves to return the valve to normal position, thereby closing the valve and cutting off the fluid connections with the pipes 45a, 46a, but as the cylinder 43 at opposite sides of the piston 42a is filled with fluid, the piston will be held against movement, so long as the valve 47 remains closed. The shank of the valve element is connected through a link to one end of a rod 50, which extends through a hollow support 51 and is provided with a core for a pair of coils also spacedly mounted in the hollow support 51. The coils, the circuits for which are later referred to, and the core constitute a double acting solenoid 51', so that by energizing one of the coils, the valve element of the valve 47 may be operated in either direction. But upon opening of the circuit for the energized coil, the core is released and the spring 49 operates to move the valve element of valve 47 to closed position and the core to neutral position ready to be acted upon by either coil of the solenoid. The hollow support 51 for the coils of the solenoid is preferably supported by brackets suitably secured to the walls of the adjacent cylinder 43. The construction of the double-acting solenoid and parts above described are more clearly shown in my co-pending application, Serial No. 455,894, filed August 24, 1942, and form the subject-matter thereof, for which reason no claim is made to these parts, in themselves, herein.

The inner ends of the rods 50 for the solenoid cores preferably have sliding support in tubes 50a fixed at their inner ends to the opposite sides of the keel in relation to an opening therein.

The adjacent ends of the tubes 50a are in registry so that a chain may be slidably mounted in the tubes 50a, the ends of the chains being connected to the rods 50 to insure movement thereof equal distances when correspondingly electrically related coils of the double acting solenoid are energized. In view of this connection between the rods 50, it will be noted that the inner coil of each solenoid and outer coil of the other solenoid are connected in the same circuit and that the rods are so connected to the valve elements or the ducts therein are so arranged that the pistons 42a when operated will move in the same direction (left or right—Fig. 11e), whereby the adjacent elements 16 will move simultaneously counter-clockwise or clockwise.

It will be observed (a) that by energizing one of the solenoid coils, the piston 42a may be moved from neutral position in either direction any desired distance within the range of movement thereof, and the valve closed by deenergizing the coil to lock the piston in operative position against movement and (b) that since the valve is closed at the end of each operation and the solenoid core is moved to its neutral position, the valve element may be operated to move the piston in the same direction or in the opposite direction dependent upon which solenoid coil is energized. By preference I provide a signal system whereby the neutral or operated positions of the pistons 42a, and hence the position of the adjacent wheels 14, may be indicated to the pilot.

As the collars 35 adjacent to and forming parts of each mechanism 11, 11a, are connected together by the connections 44 (later referred to), this signal system is related to only one cylinder and the adjacent collar. This system includes a panel 52 suitably supported in the cock-pit (Figs. 1a and 1b) and mounting the signal devices 52a (preferably consisting of lamps) designated "0" (zero position) and 9°, 18°, 27°, 36° and 45°, respectively, at either side of "0," connected in a circuit 53 (Fig. 1c). The circuit 53 consists of a lead 54 connecting one side of the battery 53a to a movable contact 55 and a lead 56 connected to the opposite side of the battery and having branch leads 56a connected to a series of contacts 57, respectively, which are arranged to be engaged by the contacts 55, during movement of the latter. As a lamp 52a is connected in each branch lead 56a, the engagement of the contact 55 with the contacts 57 will light the lamps corresponding thereto respectively. As shown in Fig. 11e, the contact 55 is engaged with contact 57 for that lamp 52a which indicates zero position, that is, the mid position of the pistons 42a and normal position of the wheels 14.

If the rotating means 33x is operated to rotate the collar 35 and element 16 to a predetermined position, the contact 55 will successively engage the contacts 57 until that contact corresponding to the selected position is reached, such movement of the contact 55 serving to momentarily successively light the lamps related to the engaged contacts 57 except the last engaged contact; the lamp 52a for the latter contact remaining lighted and indicating the operated position of the piston 42a and angular position of the wheels 14. The contacts 57 are mounted in a U-member 58, the sides of which are preferably supported on the walls of the adjacent cylinder 43, each contact 57 being slidably mounted in an opening formed in the U-member 58 and normally held in position for engagement by the movable contact 55 by a spring. The movable contact 55 is connected to the inner end of a tube 59, which is slidably mounted in the inner side of the U-member 58 and telescopes over a rod 60 supported at its outer end in the outer side of the U-member 58. The outer end of the tube 59 is pivotally connected to the arm 41, whereby the contact 55 moves with the adjacent piston 42a. The lead 54 is connected to one end of the rod 60, which forms the electrical connection for the circuit 53 from the lead 54 to the contact 55. This electrical connection as well as the mounting of the rod 60 and tube 59 and construction of the contact are preferably similar to like parts more fully shown in my aforesaid co-pending application to which reference may be made.

The connections 44 comprise the following: 61 indicates rods each connected at its outer end by a suitable universal point to an arm 41x provided on the adjacent collar 35 in diametrical relation to the arm 41 thereon. The inner end of each rod 61 is connected by a universal joint to the outer end of a link 62, the inner end of which is hingedly connected to a bracket fixed to the keel of the hull 10 (see Figs. 11e and 11f.)

The rotatable means 34 comprise the motor 40 and gears 39, 38, 37 and teeth 36 on the collar 35. As the adjacent collar 35 may be held stationary by the adjacent piston 42a, operation of the motor 40 will serve to rotate the adjacent element 16 relative to the collar and thus provide for movement of the adjacent wheel, whereby the wheel may be turned to an angle of 90°.

By preference, I provide a signal system for each retractible member 12, 12a, whereby the neutral or angular position of each element 16 and wheel 14 adjacent thereto when operated by the rotating means 34 may be indicated to the pilot. These signal means and the signal means above described are provided so that the pilot when in the cock-pit may determine the position of the wheels at any and all times, more particularly prior to a take-off or maneuvering of the airplane on the ground to avoid accidents, whereby the necessity for the pilot or other operative to inspect each wheel 14, preparatory to operation of the airplane, is eliminated.

The signal means for each rotating means 34 includes a panel 52' suitably supported in the cock-pit (Figs. 1a, 1b and 1d) and mounting the signal devices 52a' (preferably consisting of lamps) designated "0" (zero position) and 18°, 36°, 54°, 72°, and 90°, respectively, at either side of "0," connected in a circuit 53'. The circuit consists of a lead 54' connecting one side of a battery 53a' to a contact 55' mounted on the collar 35 and a lead 56' connected to the opposite side of the battery and having branch leads 56a' connected to a series of contacts 57', respectively, which, being mounted in an arcuate support 57x mounted on the adjacent element 16, are arranged to successively engage the contact 55' as the element 16 rotates, each lamp 52a' being connected in series in one of the branch leads 56a' so that during rotation of the element 16 the contacts 57' will successively engage the contact 55' to successively light the lamps 52a' and when movement of the element 16 stops, the lamp remaining lighted will indicate the operated position of the element 16 and adjacent wheel 14. The contacts 57' are preferably mounted in the support 57x similarly to the contacts 57. Lamps at right of "0" are preferably red; lamps at left of "0" are preferably green; to quickly indicate to pilot the direction of movement of the wheels.

As each member 12, 12a, of the mechanisms 11, 11a, is operated independently, I provide (a) double acting switches 62, 62a, 62b, for closing the respective circuits to the motors 26 each of which may be driven in either direction for operating the pumps 23, 24, 25, for one retractible member of one mechanism and (b) double acting switches 62, 62a, 62b, for closing the respective circuits to the motors 26, each of which may be driven in either direction, for operating the pumps 23, 24, 25, for the adjacent retractible member and (c) corresponding double acting switches (see diagrammatic Fig. 9a) for the circuits for motors 26 which operate the pumps for the retractible members 12, 12a, of the other mechanism; I also provide for one retractible mechanism a double acting switch 62x for closing the circuits to alternate coils of the solenoids 51' and double acting switches 62x' for closing the circuits for operating each motor 40 in either direction; corresponding switches for the circuits for the coils of the solenoids 51' and motors 40 for the other retractible mechanism being shown in Fig. 9a; the motors, pumps and other parts of the other mechanism being omitted from Fig. 9a to avoid duplication. The current for the circuits for the motors 26 may be supplied by (a) a suitable battery 63, or (b) by opening a switch 63a and driving a generator 64 by a suitable motor 64a.

The supply of fluid under high pressure 45a' consists of a tank 65 (see Figure 9a) filled with fluid and air under pressure which acts to supply the fluid under high pressure through the valve 47 to the cylinders 43, as already set forth. The tank 65 below the fluid level therein is connected by a pipe 66 to the out-put side of a pump 67 (which is driven by a motor 67'), in the in-put side of which is connected by a pipe with the sump 27a, whereas the tank 65 above the fluid level is connected by a pipe 68 to one end of a cylinder 69, in which is mounted a piston 70. The piston 70 is connected to one end of a rocker 71, the opposite end thereof being engaged by an expansion spring 72, the rocker serving as one contact and arranged to engage a fixed contact 73, to close the circuit for the motor 67'. Accordingly, when the air pressure in the tank 65 is reduced below the predetermined pressure (100 pounds) due to the discharge of fluid therefrom to the cylinders 43, pressure on the piston 70 is relieved, whereby the spring 72 rocks the rocker 71 to close the circuit to the motor 67' which drives the adjacent pump 67 to draw fluid from the sump 27a and discharge it into the tank 65, the effect of which is to build up the pressure therein. The raising of the pressure in the tank 65 operates to move the piston 70 and through the rocker 71 to break the motor circuit.

The supply of fluid under low pressure consists of a tank 65a (see Fig. 9a) filled with fluid and air under a lower pressure as compared to the pressure in the tank 65. The tank 65a below the fluid level therein is connected by a pipe 66a to the out-put side of a pump 67a (which is driven by a motor 67a'), the in-put side of which is connected by a pipe with the sump 27a, whereas the tank 65a above the fluid level is connected by a pipe 68a to one end of a cylinder 69a, in which is mounted a piston 70a. The piston 70a is connected to one end of a rocker 71a, the opposite end thereof being engaged by an expansion spring 72a, the rocker serving as one contact and arranged to engage a fixed contact 73a to close the circuit to the motor 67a'. Accordingly, in the event air pressure in the tank 65a is reduced below the predetermined pressure (10 pounds), pressure on the piston 70a will be relieved, whereby the spring 72a will rock the rocker 71a and close the circuit for the motor 67a', which will drive the adjacent pump 67a to draw fluid from the sump 27a and discharge it into the tank 65a, the effect of which will be to build up the pressure therein. The raising of the pressure in the tank 65a operates to move the piston 70a and through the rocker 71a to break the motor circuit. Although provision is made for automatically maintaining a predetermined pressure in the tank 65a, it will be observed that in the operation of the valves 47 the supply of fluid under high pressure to each side of the pistons 42a in the cylinders 43, in each operation of the pistons, is effective to force the fluid in the cylinders on the remote side of the pistons through the low pressure fluid connections and pipes 46a to the tank 65a, so that under normal conditions the fluid in the tank 65a is not withdrawn therefrom; on the other hand due to the supply of the fluid to the tank 65a from the cylinders 43 I provide between it and the sump 27a a connection 74 having a relief valve therein, whereby excess fluid in the tank 65a will escape into the sump 27a in the event pressure in the tank, due to supply of fluid from the cylinder 43 or otherwise, exceeds the predetermined limit.

Figures 13, 14, 14A, 15, 16, 17:
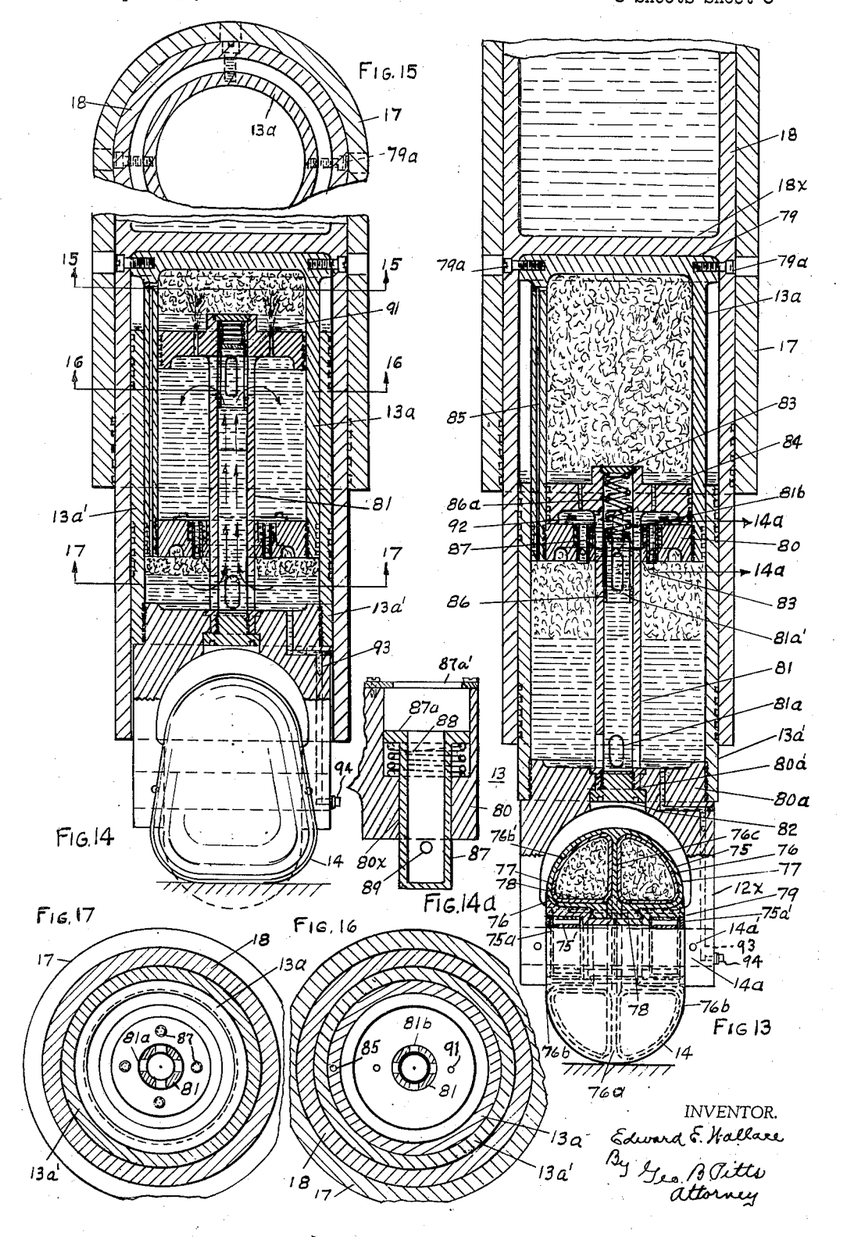
Fig. 13 is a fragmentary section of parts shown in Figs. 4, 5, 6, 7, 8, 9, 10, 11, 11b and 12, enlarged.
Fig. 14 is a view of the parts shown in Fig. 13, but in the position they occupy when a landing is taking place.
Figs. 15, 16 and 17 are sections on the lines 15—15, 16—16 and 17—17, respectively, of Fig. 14.

Figs. 13 and 14 illustrate a tire construction adapted to be used for or incorporated in the wheels for the landing gears and the wheels for the retractible members 12, 12a, such construction being illustrated by way of example as mountings for the latter. 14a indicates the wheel axle supported at its opposite ends in the depending arms 12x of the adjacent retractible member and preferably fixed thereto by pins 14a'. 76 indicates the wheel rim having adjacent its opposite ends off-set annular walls forming chambers 75a for anti-friction bearings 75', preferably of the roller type, whereby the wheel is free to turn on the axle 14a. The bearings are held in the chambers 75a by ring nuts 75a' threaded into the side walls of the chambers. The tire is mounted on and secured to the rim and consists of a carcass or casing 76 and two inner tubes 77 enclosed therein in side by side relation, these parts being so arranged that either tube 77 may be inflated or deflated independently of the other tube and accordingly it will be observed that if either inner tube is punctured or becomes deflated for any reason the other tube (if inflated) will maintain the carcass 76 in a partially expanded condition, so that operability of the wheel will not be seriously impaired. As shown, the carcass 76 consists of a tread portion 76a, side walls 76b having extensions 76b' extending throughout the circumference thereof and adapted to lie flat on the run 75 and an intermediate or division wall 76c extending inwardly radially from the center line of the tread portion 76a throughout the circumference of the latter and anchored throughout its periphery, in the manner later set forth. The marginal edge portion of the extensions 76b' are thickened to form circumferential shoulders 78, which are preferably under-cut and project into under-cuts formed in the end walls of the chambers 75a.

The wall 76c extends inwardly so as to fit between the shoulders 78 and is formed throughout its circumference with a plurality of transverse openings each in registry with alined openings formed in the shoulders 78, so that suitable countersunk screws 79 extending through openings formed in the side wall of one chamber 75a, the openings in the shoulders 78 and wall 76c and threaded into threaded openings formed in the side wall of the other chamber 75a, may rigidly secure these parts together. As shown, the wall 76c, portions of the tread 76a, the side walls 76b, and extensions 76b' form the casings for the tubes 77, which when inflated support the walls 76a and 76b as shown. The walls 76a, 76b, 76b' and 76c are formed of composite rubber (or like substance) and corded fabric or other suitable material, so that the latter wall is capable of resisting stresses thereon in the event one of the tubes 77 is deflated and the tire is under load, as shown in Fig. 14.

It will be obvious that the side walls 76b and tread portion may be suitably reinforced with one or more piles of material.

The shock absorbing means 13 incorporated in each retractile member 12, 12a, consists of the following instrumentalities; 13a indicates an inner hollow member having an inner end wall 79 abutting the transverse wall 18x of the element 18 and secured to the latter by countersunk screws 79a. The outer end of the member 13a is provided with a removable closure 80 having screw threaded connection with the inner wall of the member 13a. 13a' indicates a hollow outer member telescopically fitting the outer wall of the member 13a and inner wall of the element 18. The outer end of the member 13a' is provided with a closing member 80a, preferably screw threaded thereinto, the closing member 80a being preferably integral with and forming the support for the wheel carrying arms 12x. The closing member 80a is formed with an axially disposed opening 80a' which is enlarged at its lower end. The opening 80a' forms a seat for the lower end of a hollow rod 81, such end being closed by a screw plug 82, the flange of which engages the bottom wall of the enlarged portion of the opening 80a' so as to secure the rod to the closing member 80a. The upper end of the rod 81 slidably extends through an axially disposed opening 83 formed in the closure 80 and is provided at its upper end with a piston 84 slidably engaging the inner wall of the member 13a. The member 13a is filled with air under pressure of approximately 500 pounds and a small quantity of oil to form a seal and the outer member 13a' is filled with a quantity of fluid (oil) and air under pressure, the upper ends of the spaces in these members being in communication by a duct 85 formed in the wall of the member 13a, whereby the pressure of the air therein is equalized. The lower end portion of the rod 81 is formed with one or more inlets 81a for the oil and its upper end portion is formed with one or more outlets 81a' for the oil, the outlets being normally closed by a valve 86. The valve 86 consists of a hollow member slidably fitting the inner wall of the rod 81 and an opening 81b formed in the piston 84 in alinement with the rod 81. The side walls of the valves 86 are formed with ports arranged to register with the outlets 81a' when raised or moved upwardly. The valve 86 is normally biased downwardly into position to close the outlets 81a' by a spring 86a, which abuts the top wall of the valve and a screw cap 83 threaded into the upper end of the rod 81, the spring being designed to balance any static load to maintain the valve 86 in normal position (see Fig. 13) when the airplane is at rest or taxiing on level terrain, but when taxiing on rough terrain or in landing the spring 86a yields due to excess pressure on the valve; that is, when the outer member 13a' is forced inwardly (see Fig. 14), pressure of the oil on the valve 86 forces it upwardly against the tension of the spring 86a whereby the ports in the valve register with the outlets 81a' to permit flow of the oil through the latter into the member 13a below the piston 84. As will be observed the inward movement of the member 13a' serves to further compress the air in both members 13a, 13a', which compression is utilized to force the outer member 13a' outwardly upon release of the load thereon. Upon relief of the inward pressure on the member 13a' and movement thereof to or toward its outer position, the oil in the member 13a flows through a plurality of valves 87, which being relatively small, serve to retard such movement. Each valve 87 consists of a tube closed at its lower end and slidably fitting a through opening 80x formed in the closure 80. The upper end of the tube is provided with a flange 87a which is engaged by a coiled spring 88 surrounding the tube and seated on the bottom wall of the enlarged portion of the spring 80x. The spring 88 normally serves to support the tube 87 against downward movement, so that a port 89 in the side wall thereof is closed by the wall of the opening 80x, but upon relief of upward pressure on the outer member 13a', the pressure of the fluid in the inner member 13a serves to move the tube 87 downwardly against the influence of the spring 88 whereby the port in the side wall thereof is moved to a position below the closure 80 to permit flow of the oil into the outer member 13a'. Annular member 87a' mounted on the closure 80 concentric to the openings 80x limit the upward movements of the valves 87. The piston 84 is formed with a plurality of through ducts 91 so that a small quantity of the oil may be maintained thereabove for sealing the walls of the piston. As shown in Fig. 14, when the outer member is moved inwardly, portions of the oil are forced through the ducts 91 into the space above the piston, but when the outer member moves outward excess oil is forced back through these ducts, due to the air pressure in the inner member 13a, into the recess 92 provided on the inner face of the piston 84. The engagement of the piston 84 with the closure 80 serves to limit the outward movement of the outer member 13a.

It will also be observed that I provide a dual piston form of construction so arranged that in the return of the parts to normal position the compressed air operates uniformly and simultaneously on both pistons, that is, the piston 84 and closing member 80a, during return flow of the oil through the valves 87, the effect of which is to reduce the load on the hollow rod 81 approximately one-half. In the up-stroke of the pistons 84, 80a, the pressure of the air in the members 13a, 13a', is equalized, since the oil forces the piston 84 upwardly and therefore the rod 81 is relieved of any load and serves only to connect the pistons together and as a conduit for the oil.

Air under pressure is supplied to the members 13a, 13a', through a conduit 93 formed in the closure member 80a and the outer wheel supporting arm 12x, the outer end of the conduit being closed by a screw plug 94 having a suitable valved port therein. The required quantity of oil for the member 13a' is also supplied thereto through the conduit 93.

It will be understood that the shock absorbing means 13 are mounted on the outer end of each retractile member 12, 12a, and are operable in any projected position of the latter.

62z indicates a throw-out switch (see Fig. 9a).

In the form of construction illustrated either or both end portions of the fuselage 2 may be utilized for storage of goods, equipment and supplies, as well as to permit access to the mechanisms 11, 11a, and other equipment.

For these purposes, I provide floors 95 and transverse partitions 96, the latter being spaced longitudinally of the fuselage. The retractile members 12, 12a, extend through openings formed in the floors. As already set forth each member 12, 12a, is removable through the adjacent opening 10a, but in some instances, to inspect or service each member, it may be moved upwardly endwise a short distance and then its lower end swung inwardly and supported on the keel or the member may be bodily positioned on its side wall (cylinder 16) on the keel. To permit of these operations, those portions of the floors, indicated at 95', between the members 12, 12a, are detachable from adjacent portions of the floors and removably supported on blocks or brackets 97 fixed to the inner ends of the partitions 96.

In providing relatively movable retractile, wheel mounted members at the opposite ends of the fuselage and providing means for rotating these members, whereby the wheels may be positioned either for steering or to permit tilting, various operations may be carried out independently of the speed of the airplane and the speed of its propeller, so that steering and maneuvering operations of the airplane are not dependent upon its rudder; also, this form of construction enables the airplane to be operated under certain adverse conditions; for example in the event the propelling means on one wing becomes inoperative, this would not preclude steering or maneuvering of the airplane in any desired direction by operation of the other propelling means and rotating the members 12, 12a, of the retractile mechanism which are in engagement with the terrain.

To those skilled in the art to which my invention relates many changes in construction and widely differing embodiments and applications of the invention will be apparent without departing from the spirit and scope thereof. My disclosure and the description herein are purely illustrative and not intended to be in any sense limiting.

What I claim is:

1. In an airplane, the combination with a fuselage or hull and a landing gear mechanism therefor, of a retractile mechanism mounted in said fuselage or hull adjacent one end thereof and comprising telescopically related elements the outer one of which is rotatably mounted in said fuselage and the inner elements being arranged to be projected outwardly relative to said outer element and each other, said innermost element being provided at its outer end with a wheel for engagement with a landing surface for co-operation with said landing gear mechanism, means between each of said elements and the adjacent element or elements for preventing rotation thereof one relative to the other, means for operating each of said inner elements outwardly and inwardly, and means for rotating said outer elements.

2. In an airplane having a fuselage or hull and wing structures at opposite sides thereof, the combination with a landing gear below each said wing structure, of a retractile mechanism consisting of member rotatably mounted in said fuselage or hull adjacent one end thereof, endwise relatively movable elements movable outwardly relative thereto for engaging one of said elements with a landing surface and means for maintaining said member and respective elements in non-rotative relation, a wheel mounted on the outer end of said surface engaging element, with its axis cutting the longitudinal axis of said member, means for operating said member outwardly and inwardly, and means for rotating said member.

3. In an airplane having a fuselage and wing structures at opposite sides thereof, of landing gears intermediate the ends of said fuselage and below said wing structures, retractile mechanisms mounted within said fuselage forward and rearward of said landing gears, each said mechanism comprising a pair of members mounted at opposite sides of the longitudinal axis of said fuselage and each including an element movable outwardly for engagement with the terrain, and power means for independently moving each of said elements outwardly and inwardly.

4. In an airplane, the combination of a cylinder mounted in one end portion of the airplane, a head fixedly mounted in said cylinder, a cylindrical element surrounding said head and provided outwardly thereof with a transverse wall forming a piston arranged to move outwardly and inwardly relative to said cylinder, said element being provided intermediate its ends with an external circumferential wall, a cylindrical element between said cylinder and said first-mentioned cylindrical element and provided at its outer end portion with an internal circumferential wall disposed in the path of movement of said first mentioned wall, whereby movement of said first mentioned element outwardly effects engagement of said walls and movement of said last mentioned element outwardly relative to said cylinder, said last mentioned element having at its inner end an external circumferential wall, a ground engaging member mounted on the outer end of said first mentioned element, hydraulic means for operating said piston outwardly and inwardly, and hydraulic means for moving said last mentioned element inwardly.

5. In an airplane, the combination of a cylinder mounted in one end portion of the airplane, a head fixedly mounted in said cylinder intermediate the ends thereof, a cylindrical element normally disposed in said cylinder around said head and provided at its outer end with a wall outwardly of said head, said head and end wall being formed with alined through openings, a separate cylindrical element normally disposed within said cylinder in surrounding relation to said first mentioned cylindrical element and movable endwise relative thereto and provided at its outer end with a member for engagement with the terrain, said last mentioned element being provided with a transverse wall outwardly of said end wall, means for limiting the outward movement of said last mentioned element, means for supplying fluid under pressure to said head for first applying pressure to the transverse wall on said last mentioned element to move it a predetermined distance and fill the space therein with fluid and thereafter for applying pressure to said transverse wall on said first mentioned element to move both said elements a predetermined distance.

6. In an airplane, the combination of a cylinder mounted in one end portion of said fuselage, a fixed tubular member extending into said cylinder and provided at its inner end with a head, said head being formed with a through opening leading from said tubular member, a cylindrical element slidably fitting said head at its outer end portion and provided internally at its inner end with an annular wall slidably fitting said tubular member, said element being provided with an end wall outwardly of said head and said wall being formed with a port, a separate cylindrical element normally mounted within said cylinder and movable outwardly relative thereto, said separate element being provided at its outer end with a member for engagement with the terrain and a transverse wall outwardly of said first mentioned end wall, means for supplying fluid under pressure through said tubular member and opening in said head to said transverse wall to move said separate element outwardly and then to said end wall to move both said elements outwardly, and means for moving said first-mentioned element inwardly, comprising a conduit leading through said tubular member and connected to the inner end of the space between it and said element and a pump for supplying fluid under pressure through said conduit to said space.

7. An airplane as claimed in claim 4 wherein shock absorbing means are provided between said terrain engaging device and its carrying element.

8. In an airplane, the combination of a cylinder adapted to be mounted in one end portion of the airplane, a head fixedly mounted in said cylinder and formed with a through opening, an inner cylindrical element slidably engaging said head and normally filled with fluid and provided with a piston outwardly of said head, said piston being formed with a through opening, an outer cylindrical element slidably fitting the outer end of said cylinder and provided at its inner end with an external piston slidably fitting said cylinder and provided at its outer end with an internal shoulder, the space between said cylinder and outer element being normally filled with fluid, an intermediate cylindrical element between said inner and outer elements and provided with a piston outwardly of the piston on said inner element and carrying at its outer end a device for engaging the terrain and provided intermediate its ends with an external shoulder arranged to engage the shoulder on said outer element to move the latter outwardly, a pump having connections with said head for applying pressure therethrough to the piston on said intermediate element to move the latter outwardly, a pump for withdrawing fluid from the space between said cylinder and outer element during outward movement of the latter, and a pump for withdrawing fluid from said inner element during outward movement thereof.

9. In an airplane, the combination of a cylinder adapted to be mounted in the airplane with its outer end in registry with an opening in its wall, an element normally mounted within said cylinder and slidable outwardly and inwardly relative thereto through said opening, hydraulic means for operating said element, the outer end portion of said element being provided with a chamber, and shock absorbing mechanism mounted in said chamber, said mechanism comprising an inner inverted cylinder, an outer cylinder having a closed outer end carrying a terrain engaging member and telescopically fitting said inner cylinder, a closure carried by said inner cylinder, said cylinders being charged with a gas under pressure and the outer cylinder being partially filled with liquid, the gas normally maintaining said cylinders in expanded relation, a piston slidably fitting the wall of said inner cylinder, connections between said piston and said outer cylinder, said connections including means permitting flow of the liquid from said outer cylinder to said inner cylinder during inward movement of said outer cylinder, and a by-pass valve mounted in said closure.

10. In an airplane, the combination of a cylindrical support arranged to depend from one end portion of the airplane, an inner inverted cylinder fixedly mounted in said support in concentric spaced relation to the walls thereof, an outer cylinder telescopically fitting walls of said inner cylinder and said support, and provided with an outer end wall having a terrain engaging device, a closure for the outer end of said inner cylinder, said cylinders being charged with a gas under pressure and the outer cylinder being partially filled with liquid, the gas normally maintaining said cylinders in expanded relation, a piston slidably fitting the wall of said inner cylinder, connections between said piston and said outer cylinder, said connections including means permitting flow of the liquid from said outer cylinder to said inner cylinder during inward movement of said outer cylinder, and a by-pass valve mounted in said closure.

11. In an airplane having a fuselage, the combination of a cylinder adapted to be rotatably mounted in the airplane, a member in said cylinder connected thereto for rotation with said cylinder and movable endwise relative thereto, a wheel mounted on the outer end of said member, normally disposed parallel to said fuselage, hydraulic means for rotating said cylinder through an arc in either direction, and power driven gearing for rotating said cylinder through an arc in either direction.

12. In an airplane, the combination of a cylinder adapted to be rotatably mounted in the airplane, a member in said cylinder connected thereto for rotation with said cylinder and movable endwise relative thereto, a wheel mounted on the outer end of said member, normally disposed parallel to the longitudinal axis of the airplane, power driven gearing for rotating said cylinder through an arc in either direction, hydraulic means for rotating said cylinder through an arc in either direction, said hydraulic means including a normally closed control valve, and means for operating said valve to open position and releasing it for operation to closed position to stop the operation of said hydraulic means.

13. In a shock absorbing means for a portable vehicle, the combination with a member adapted to be mounted on the body of the vehicle, of an inner inverted cylinder having a closure mounted in its open end and filled with a gas under pressure, an outer cylinder telescopically fitting between said inner cylinder and said member and having an outer end wall carrying a terrain engaging device, said outer cylinder being partially filled with gas under pressure and liquid, a gas connection between said cylinders, whereby the pressure therein is maintained equalized, the gas pressure serving normally to maintain said cylinders in expanded relation, a piston within and slidably fitting the walls of the said inner cylinder, means connecting said piston to the end wall of said outer cylinder, said connecting means including a valve to permit flow of liquid from said outer cylinder to said inner cylinder during inward movement of said outer cylinder relative to said inner cylinder, and a bypass valve mounted in said closure to permit return flow of the liquid during movement of said outer cylinder in the opposite direction.

14. A vehicle as claimed in claim 13, wherein the first mentioned valve is normally closed but automatically opens due to excess pressure on the liquid in the outer cylinder upon movement of the latter inwardly.

15. In an airplane, the combination with a fuselage and a landing gear mechanism therefor, of adjustable mechanism adjacent one end of said fuselage for co-operating with said landing gear mechanism for supporting said fuselage in making landings or take-offs and for movably supporting it when on a landing surface, said adjustable mechanism consisting of an outer member mounted in said fuselage and a plurality of concentrically related, endwise relatively movable members movably mounted in said outer member, the innermost member being provided on its outer end with a ground engaging device, and hydraulically operated means within and between said member for initially moving said innermost member outwardly a predetermined distance and for operating said other inner members to move said innermost member outwardly other predetermined distances.

16. In an airplane having a fuselage, the combination with a landing gear mechanism, of a retractile mechanism mounted in said fuselage adjacent one end thereof, said retractile mechanism comprising a pair of spaced members each consisting of endwise relatively movable, non-rotatively related elements, the outermost one of which is rotatably mounted in said fuselage, means for operating certain of the remaining elements outwardly for cooperating with said landing gear mechanism, means connected with said outermost elements for simultaneously rotating said members, and a ground engaging device mounted on the outer end of one of said remaining elements.

17. In an airplane having a fuselage, the combination with a landing gear mechanism, of a retractile mechanism mounted in said fuselage adjacent one end thereof, said retractile mechanism comprising a pair of spaced members each consisting of endwise relatively movable, non-rotatively related elements, the outermost one of which is rotatably mounted in said fuselage, means for operating certain of the remaining elements outwardly for cooperating with said landing gear mechanism, means connected with said outermost elements for simultaneously rotating said members, separate means for rotating each member independently of the other member, and a ground engaging device mounted on the outer end of one of said remaining elements.

18. In an airplane having a fuselage, the combination with a landing gear mechanism, of a retractile mechanism mounted in said fuselage adjacent one end thereof, said retractile mechanism comprising a pair of spaced members each consisting of endwise relatively movable, non-rotatively related elements, the outermost element of one of said members being rotatably mounted in said fuselage, means for operating certain of the remaining elements outwardly for cooperating with said landing gear mechanism, a ground engaging device mounted on the other end of one of said remaining elements, and means connected with said rotatable outermost element for rotating it to position the adjacent ground engaging device at an angle to the longitudinal axis of the fuselage.

EDWARD E. WALLACE.

REFERENCES CITED

The following references are of record in the file of this patent:

UNITED STATES PATENTS

| Number | Name | Date |
|---|---|---|
| 1,404,532 | Lehr | Jan. 24, 1922 |
| 1,482,520 | Lyon | Feb. 5, 1924 |
| 1,497,584 | Petey | June 11, 1924 |
| 1,576,342 | McElhaney | Mar. 9, 1926 |
| 1,716,439 | Gray | June 11, 1929 |
| 1,842,776 | Bogoslowsky | Jan. 26, 1932 |
| 1,930,922 | Burnelli | Oct. 17, 1933 |
| 1,981,856 | Downey | Nov. 27, 1934 |
| 2,049,209 | Bogoslowsky | July 28, 1936 |
| 2,075,042 | Knerr | Mar. 30, 1937 |
| 2,156,288 | Holliday | May 2, 1939 |
| 2,159,058 | Taylor et al. | May 23, 1939 |
| 2,191,359 | Thornhill | Feb. 20, 1940 |
| 2,224,641 | Burnelli | Dec. 10, 1940 |
| 2,238,411 | Conklin | Apr. 15, 1941 |
| 2,276,466 | Cleveland | Mar. 17, 1942 |
| 2,313,242 | Johnson | Mar. 9, 1943 |
| 2,323,279 | Van Zelm | June 29, 1943 |